United States Patent
Fan et al.

(10) Patent No.: US 9,020,200 B2
(45) Date of Patent: Apr. 28, 2015

(54) GEOMETRIC PRE-CORRECTION FOR AUTOMATIC LICENSE PLATE RECOGNITION

(75) Inventors: Zhigang Fan, Webster, NY (US); Yonghui Zhao, Penfield, NY (US); Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 437 days.

(21) Appl. No.: 13/494,302

(22) Filed: Jun. 12, 2012

(65) Prior Publication Data
US 2013/0329961 A1 Dec. 12, 2013

(51) Int. Cl.
*G06T 5/00* (2006.01)
*G06K 9/32* (2006.01)

(52) U.S. Cl.
CPC ............ *G06K 9/3258* (2013.01); *G06K 9/3275* (2013.01); *G06T 5/006* (2013.01)

(58) Field of Classification Search
None
See application file for complete search history.

(56) References Cited

U.S. PATENT DOCUMENTS

2012/0275653 A1* 11/2012 Hsieh et al. ................. 382/105

OTHER PUBLICATIONS

Liu, Lin, et al. "Slant correction of vehicle license plate image." Image Analysis and Processing—ICIAP 2005. Springer Berlin Heidelberg, 2005. 237-244.*
Jiao, Jianbin, Qixiang Ye, and Qingming Huang. "A configurable method for multi-style license plate recognition." Pattern Recognition 42.3 (2009): 358-369.*
Anagnostopoulos et al., "License Plate Recognition From Still Images and Video Sequences: A Survey", IEEE Trans. On Intelligent Transportation Systems, vol. 9 (3), Sep. 2008, pp. 377-391.

* cited by examiner

*Primary Examiner* — Stephen R Koziol
*Assistant Examiner* — Raphael Schwartz
(74) *Attorney, Agent, or Firm* — Fay Sharpe LLP

(57) ABSTRACT

A method for adjusting a license plate that is detected in a captured image includes automatically determining at least one set of correction parameters corresponding to a slant-oriented license plate. The method further includes receiving an input image representing a detected license plate. In response to receiving the input image, the method includes automatically adjusting the input image to obtain a corrected image using the at least one set of correction parameters.

18 Claims, 10 Drawing Sheets

GEOMETRIC PRE-CORRECTION FOR AUTOMATIC LICENSE PLATE RECOGNITION

BACKGROUND

The present disclosure relates to a method and apparatus for automatically adjusting a license plate that is detected in a captured image so that the license identification number can be analyzed and identified. It is appreciated that the present exemplary embodiments are also amendable to other like applications.

An automatic license plate recognition (ALPR) system is a vehicular surveillance system that captures images of moving or parked vehicles using a still or video camera. The system locates a license plate in the image and uses optical character recognition (OCR) to determine the license plate number. The ALPR system often functions as a core module for an intelligent transportation infrastructure system as its many uses can include monitoring traffic flow, enforcing traffic laws, and tracking criminal suspects.

One challenge to the ALPR technology is its robustness to geometric variations. The position of a camera, such as the incidence angle between the camera and a target capture area, and parameters of the camera can affect the quality of the captured image due to distortion. The license plate in the image may be affected by a different scale, rotation angle or other geometric distortion. While most ALPR cameras are carefully positioned to minimize perspective distortion, severe shearing is still a common result.

One possible solution for distortion is to design an ALPR algorithm that is invariant to geometric changes. However, such a solution is often hindered by increased computational costs and other implications, such as, for example, a reduced accuracy of detection. Generally, the inherent computational complexity, and the computational cost, of a system are proportional to the product of the search range for each geometric parameter.

For many ALPR applications, such as monitoring toll gates on toll roads, the geometric configuration is usually fixed, or has limited variation, for each camera. Therefore, conventional ALPR systems rely on user-input to reduce a search range. For example, the system may ask a user to specify anticipated minimum and maximum heights of the license plates in the input images. The system uses the information received as user-inputs for determining scale. The system may also receive an anticipated maximum plate angle as a user-input.

There are several disadvantages and limitations for the practice of receiving user-inputs for analyzing purposes. The users must possess a certain image processing knowledge for measuring the plate height and rotation angle contained in the images while certain parameters, such as shearing, are not readily obtained by the users. This practice also requires a significant amount of work be performed by users. Furthermore, the manual inputs that are provided by the users may be incorrect or inaccurate. The system may therefore rely on inaccurate measurements for performing its analysis. Therefore, a need exists for a method and an apparatus that automatically adjusts the images of license plates that are detected in captured images.

Another disadvantage with the conventional practice is that the actual geometrical and camera parameters may drift over time. For example, the camera may tilt from its original position. Accordingly, a method and apparatus is needed which automatically calibrates parameters of an ALPR camera to compensate for displacement over time. In this manner, the system is adapted to automatically estimate, in advance, the amount of shearing to expect from a captured image before a vehicle arrives at the image capture device. Accordingly, a system is needed that is adapted to estimate shearing patterns is an image capture device.

BRIEF DESCRIPTION

A first embodiment of the present disclosure is directed toward a method for adjusting a license plate that is detected in a captured image. The method includes automatically determining at least one set of correction parameters corresponding to a slant-oriented license plate. The method further includes receiving an input image representing a detected license plate. In response to receiving the input image, the method includes automatically adjusting the input image to obtain a corrected image using the at least one set of correction parameters.

Another embodiment of the disclosure is directed toward a system for adjusting an input image. The system includes an input device that is adapted to capture an image of a license plate. The system further includes a correction device in communication with the input device. The correction device is adapted to receive the input image transmitted from the input device. In response to receiving the input image, the correction device is further adapted to automatically adjust the input image to obtain a corrected image by applying at least one correction matrix. The system includes a storage device in communication with the correction device. The storage device is adapted to store the at least one correction matrix. The system further includes an interface in communication with the correction device, the interface is adapted to display the corrected image.

A further embodiment of the disclosure relates to a system for adjusting an input image. The system includes a training device that is adapted to receive images of a number of plates. The training device is adapted to determine a matrix containing feature sets for each of the number of plates. The training device is further adapted to determine an ideal geometry matrix by specifying height and width feature sets of a number of ideal plates. The training device is then adapted to calculate a correction matrix using the matrix and the ideal geometry. The system further includes a storage device in communication with the training device. The storage device is adapted to store the at least one correction matrix. The system also includes an input device that is adapted to capture an image of a detected license plate. The system includes a correction device in communication with the input device and the storage device. The correction device is adapted to receive the captured image transmitted from the input device. In response to receiving the input image, the correction device is adapted to automatically adjust the input image to obtain a corrected image by applying the at least one correction matrix. The system includes an interface in communication with the correction device. The interface is adapted to display the corrected image.

DETAILED DESCRIPTION

The present disclosure relates to an ALPR correction system and a method for automatically calibrating a camera and for automatically processing and/or correcting images captured by the camera. The input images undergo automatic scaling and shearing operations to reduce geometric distortion. The ALPR correction system is directed toward ALPR applications that use a fixed camera configuration, such as in tolling operations. The method is performed in two phases: a calibration phase and an operation phase. During the calibration phase, the ALPR correction system operates in a full range that covers all possible scale and shearing parameters, whereby rotation is considered as a special case of shearing. From the geometry of a detected license plate, the ALPR correction system estimates the scaling and shearing characteristics associated with the camera setting. The ALPR correction system then determines an optimal correction matrix. During the operation phase, the correction matrices learned from the calibration are applied to a captured image of a license plate. The correction matrices are used to correct the shearing distortion and to scale the detected license plate to a pre-determined size. The ALPR correction camera is then adapted to operate at a reduced range, which detects the plates roughly in the same size and in the same rectangular shape.

Figure 1:
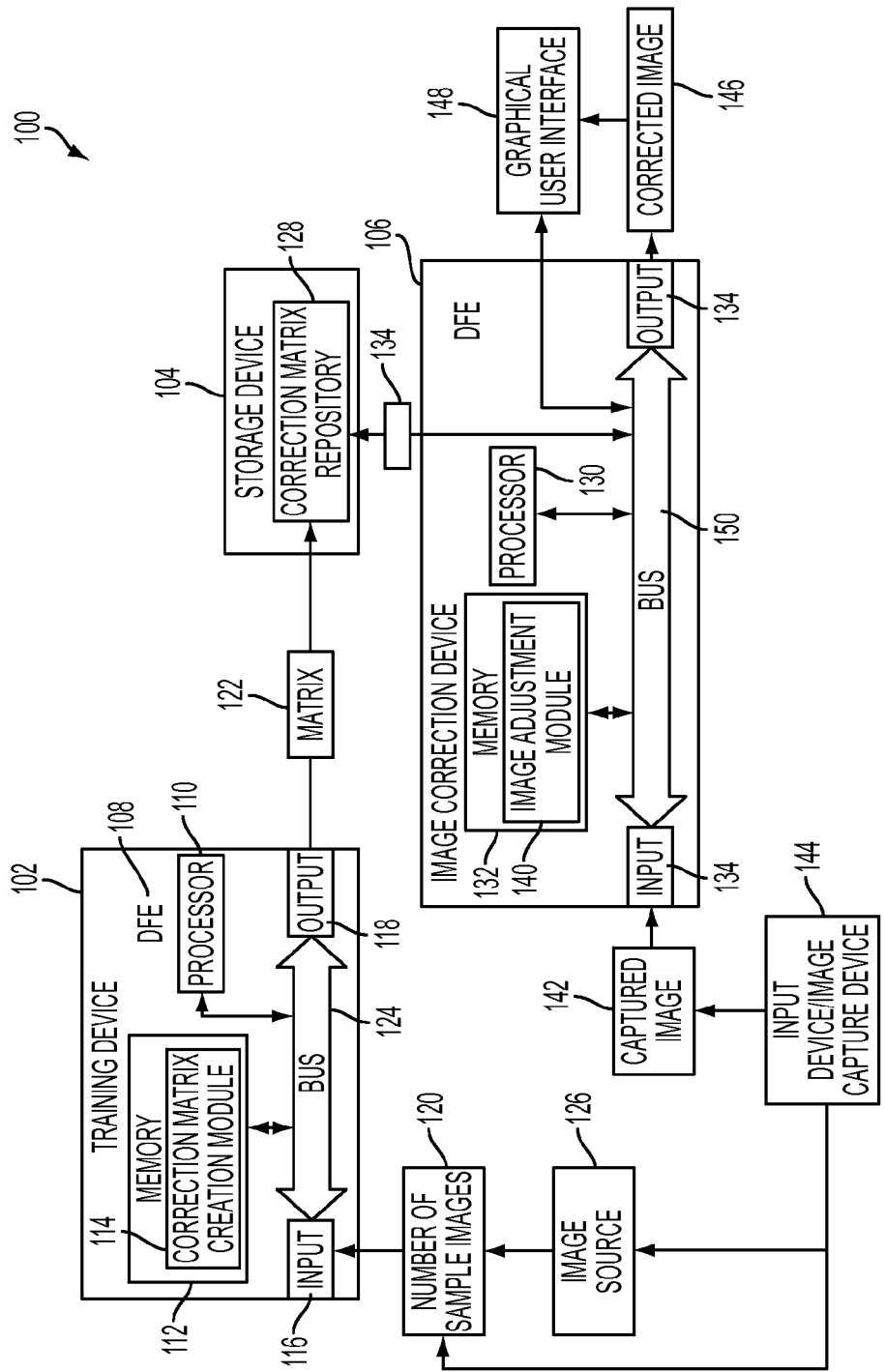
FIG. 1 is a schematic illustration of an ALPR correction system according to one embodiment.

FIG. 1 is a schematic illustration of an ALPR correction system 100 in one exemplary embodiment. The ALPR correction system includes a training device 102, a storage device 104, and a correction device 106, which may be linked together by communication links, referred to herein as a network. These components are described in greater detail below.

The training device 102 illustrated in FIG. 1 includes a controller 108 that is part of or associated with the training device 102. The exemplary controller 108 is adapted for controlling a training of the ALPR system 100 by forming correction matrices that can be later applied to detected images. The controller 108 includes a processor 110, which controls the overall operation of the training device 102 by execution of processing instructions that are stored in memory 112 connected to the processor 110.

The memory 112 may represent any type of tangible computer readable medium such as random access memory (RAM), read only memory (ROM), magnetic disk or tape, optical disk, flash memory, or holographic memory. In one embodiment, the memory 112 comprises a combination of random access memory and read only memory. The digital processor 110 can be variously embodied, such as by a single-core processor, a dual-core processor (or more generally by a multiple-core processor), a digital processor and cooperating math coprocessor, a digital controller, or the like. The digital processor, in addition to controlling the operation of the training device 102, executes instructions stored in memory 112 for performing the parts of the method outlined in FIGS. 2 and 7. In some embodiments, the processor 110 and memory 112 may be combined in a single chip.

The training device 102 may be embodied in a networked device, although it is also contemplated that the training device 102 may be located elsewhere on a network to which the ALPR correction system 100 is connected, such as on a server, networked computer, or the like, or distributed throughout the network or otherwise accessible thereto. The training phase disclosed herein is performed by the processor 110 according to the instructions contained in the memory 112. In particular, the memory 112 stores a correction matrix creation module 114, which receives a number of sample plate images, determines a matrix containing feature sets for each of the sample images, determines an ideal geometry by specifying ideal height and width feature sets for the plates, and calculates a correction matrix using the matrix and ideal geometry. Embodiments are contemplated wherein these instructions can be stored in multiple modules. The correction matrix creation module 114 will be later described with reference to the exemplary method.

The software modules as used herein, are intended to encompass any collection or set of instructions executable by the training device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions.

With continued reference to FIG. 1, the training device 102 also includes one or more communication interfaces, such as network interfaces, for communicating with external devices. The communication interfaces 116, 118 may include, for example, a modem, a router, a cable, and/or Ethernet port, etc. A first communication interface 116 is adapted to receive sample images 120 as input. A second communication interface 118 is adapted to provide at least one correction matrix 122 as output. In contemplated embodiments, one communication interface can receive the input and provide the output. The various components of the training device 102 may be all connected by a bus 124.

The training device 102 may include one or more special purpose or general purpose computing devices, such as a server computer or digital front end (DFE), or any other computing device capable of executing instructions for performing the exemplary method.

FIG. 1 further illustrates the training device 102 connected to an image source 126 for inputting and/or receiving sample images in electronic format. The image source 126 may include an image capture device 144, such as a camera that is selected to be calibrated, or it can be a device adapted to relay and/or transmit the images captured by the camera to the training device. For example, the image source 126 can include a scanner, a computer, or the like. In another embodiment, the image data 120 may be input from any suitable source, such as a workstation, a database, a memory storage device, such as a disk, or the like. The image source 126 is in communication with the controller 106 containing the processor 110 and memories 112.

With continued reference to FIG. 1, the ALPR correction system 100 includes a storage device 104 in communication with the training device 102. In a contemplated embodiment, the training device 102 can be in communication with a server (not shown) that includes a processing device and memory, such as storage device 104, or has access to a storage device 104, for storing correction matrices that can be used by the correction device 106. The storage device 104 includes a correction matrix repository 128, which stores at least one correction matrix 122 provided by the training device 102.

Figure 2:
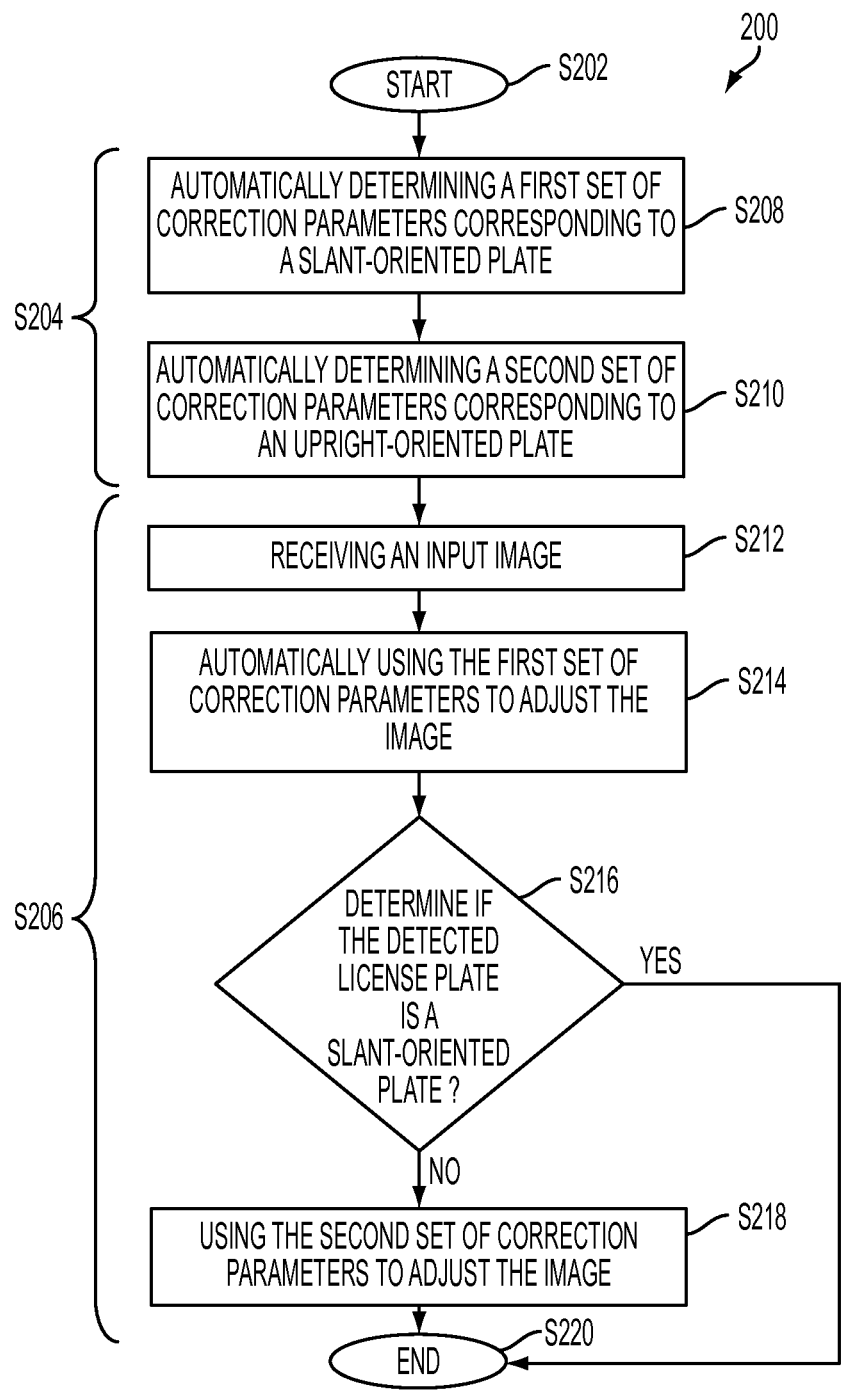
FIG. 2 is a flow chart describing a method for correcting an image of a license plate.
Figure 8:
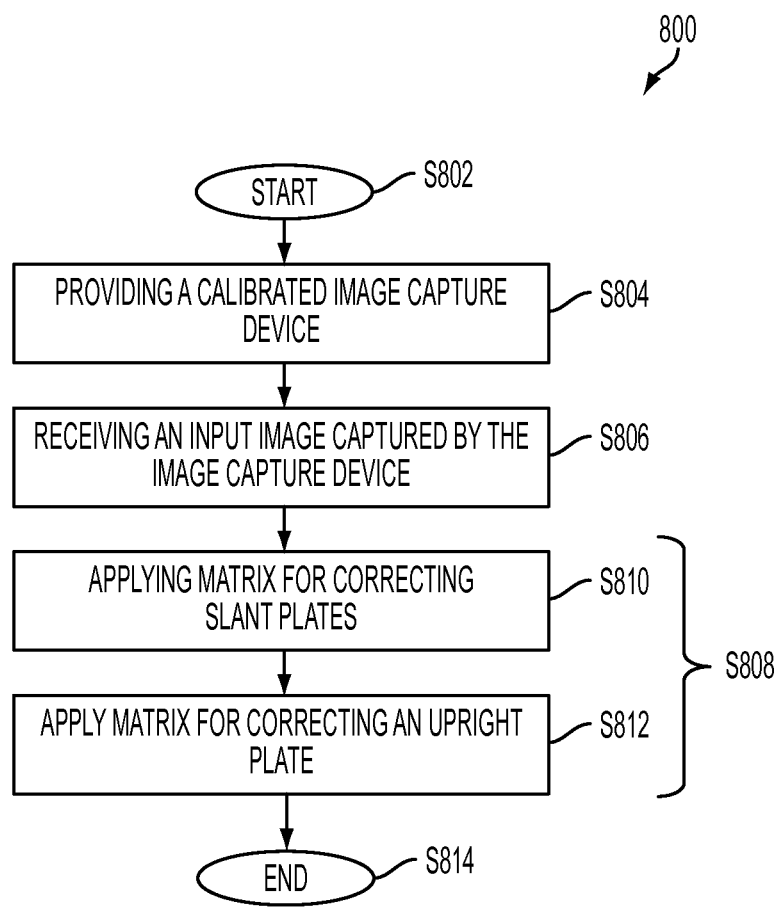
FIG. 8 is a flow chart that describes the operation phase using the at least one correction matrix for adjusting a captured image.

With continued reference to FIG. 1, the ALPR correction system 100 further includes the image correction device 106 in communication with the storage device 104 that is adapted to perform the method outlined in FIGS. 2 and 8. The exemplary image correction device 104 includes, for example, a computer or microcomputer. The image correction device 104 may be included as part of an image capture device 142 or it may be in communication with the image capture device 142. The image correction device 106 includes a processor 130, such as a CPU, and a memory 132 for storing software modules executable on the processor of the CPU and at least one communication interface 134 including hardware and/or software suitable for providing wireless data communication with the storage device 104, an image capture device 136, and a display 138. The memory 132, processor 130, and communication interface(s) 134 can be similarly configured to memory 112, processor 110, and communication interface 116, 118 of the training device 102. The exemplary software module includes an image adjustment module 140, which receives a captured image 142 transmitted from an input device 144, and in response to receiving the input image 142, automatically adjusts the input image 142 to obtain a corrected image 146 by applying the at least one correction matrix 122. This module 140 will be later described with reference to the exemplary method. The various components of the image correction device 106 may be all connected by a bus 150.

With continued reference to FIG. 1, the actual data may undergo processing by the image correction device 106 and may be displayed to the user in a suitable form on a GUI 148 in communication with the image correction device 106. The GUI 148 can include a display, for displaying information, such as the corrected image 146 or the license number in the corrected image, to users, and a user input device, such as a keyboard or touch or writable screen, for receiving instructions as input, and/or a cursor control device, such as a mouse, trackball, or the like, for communicating user input information and command selections to the processor 130.

FIG. 2 is a flowchart describing a method 200 for correcting an image of a license plate. The method starts at S202. The method includes training (synonymously referred to herein as "calibrating") a camera at S204 in a first phase and correcting images from the camera at S206 (synonymously referred to herein as "operating the camera") in a second phase. The training S202 includes automatically determining a first set of correction parameters corresponding to a license plate at S208. The license plate includes a slant-oriented plate, which means that the license plate is mounted to a bumper region of a vehicle at a generally inclined orientation. The training S202 also includes automatically determining a second set of correction parameters corresponding to an upright-oriented plate at S210, which means that the license plate is mounted to the bumper region of a vehicle at a generally vertical position. Generally frontal license plates are oriented upright while rear-mounted license plates can be oriented slanted or upright.

With continued reference to FIG. 2, the correcting at S204 includes receiving an input image at S212. The input image includes an image of a captured vehicle or bumper region on the vehicle. The method includes determining if a license plate is detected in the image. The method includes automatically using the first set of correction parameters to adjust the image at S214. Using the parameters, the method includes determining whether the detected image is a slant-oriented plate at S216. If the determination indicates that the detected license plate is not a slant-oriented plate, then the method includes automatically using the second set of correction parameters to adjust the image at S218. The method ends at S220.

Geometrical Distortion

Almost all license plates are rectangular in shape. Standard-issue passenger plates, for most states in the United States, have similar designs, layouts, and dimensions. Furthermore, slanted plates are generally mounted at roughly the same angle.

Figure 3:
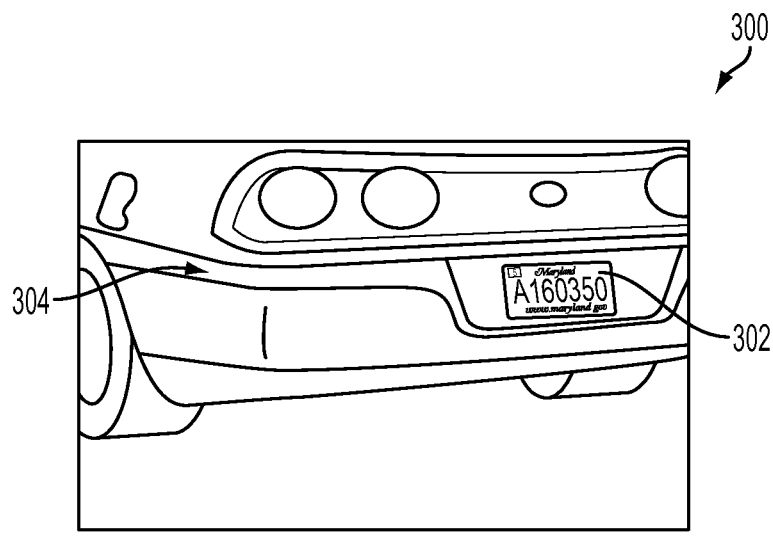
FIG. 3 shows a rear-mounted plate that has been distorted in an image.
Figure 4:
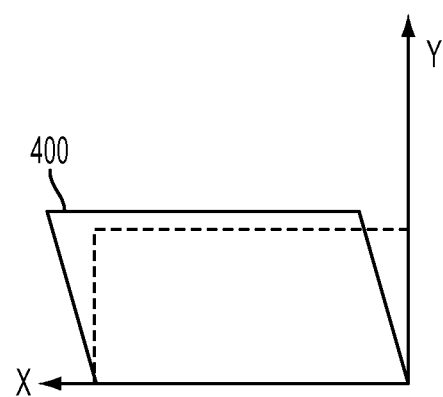
FIG. 4 shows a shear transformation for approximating distortion of the plate shown in FIG. 3.

When images of plates are captured by the ALPR camera, the images are subject to perspective distortion. FIG. 3 shows an example of a rear-mounted plate 302 that has been distorted in an image 300 that is a captured rear bumper region on a vehicle 304. In many ALPR applications such as tolling, the distortion 400 can be approximated by shear transformation, which is shown in FIG. 4. The shearing can be mathematically represented by a two-dimensional matrix:

$$SH = \begin{bmatrix} 1 & shx \\ shy & 1 \end{bmatrix} \quad (1)$$

In the shear matrix SH, shx and shy are the shearing factors in the x and y directions, respectively. Every shear matrix has an inverse, and the inverse is simply a shear matrix with the shear element negated, which represents a shear transformation in the opposite direction. As a result, the shearing and/or distortion of the license plate in the captured image can be corrected by shearing the plate towards an opposite direction.

Because frontal plates are typically mounted upright and are perpendicular to the direction that the vehicle moves, it is presumed that all frontal plates face roughly the same direction. Shearing of the frontal plates can be approximated using a single matrix.

Figure 5:
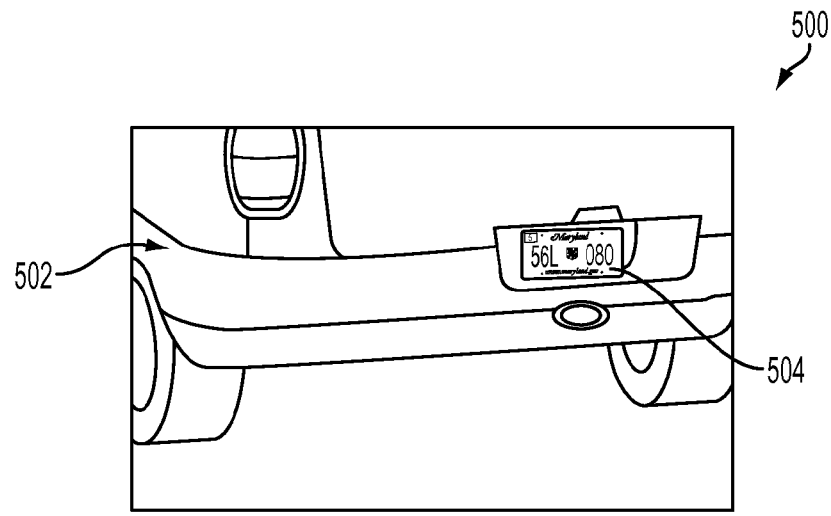
FIG. 5 shows a plate mounted in a generally upright orientation on a vehicle.
Figure 6:
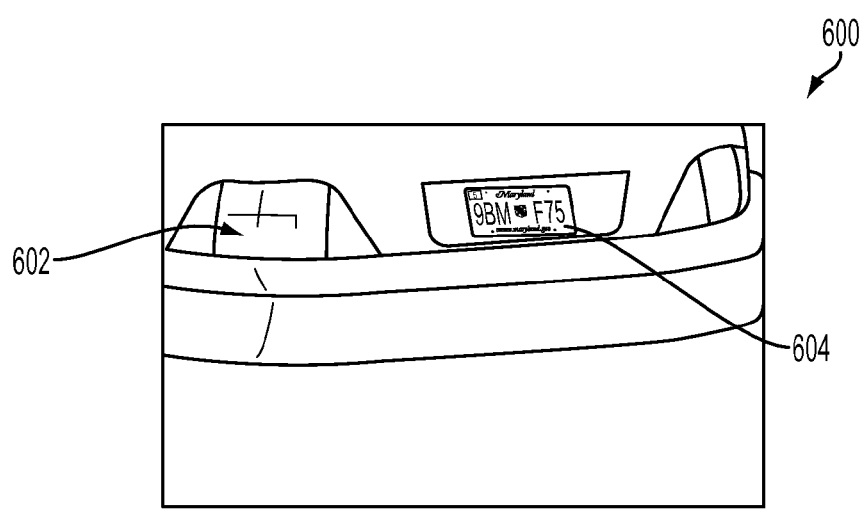
FIG. 6 shows a plate mounted on a generally slanted orientation on a vehicle.

However, as mentioned, rear-mounted plates can be either mounted upright or slanted inwards. FIG. 5 shows an image 500 of a rear bumper region 502 including an upright oriented plate 504. Similarly, FIG. 6 shows an image 600 of a rear bumper region 602 including a slant-oriented plate 604. A different shear matrix is needed for each orientation. A first correction matrix (i.e., a first shear matrix) is needed to represent a shear transformation of the slanted plate and a second correction matrix (i.e. second shear matrix) is needed to represent a shear transformation of the upright plate.

Similarly, the scaling is also normalized during calibration of the detected plates in the captured images. A scale matrix, which can also be inverted, is represented below:

$$S = \begin{bmatrix} sx & 0 \\ 0 & sy \end{bmatrix} \quad (2)$$

The sx and sy are the scaling factors in the x and y directions. A combination of the shearing and scaling can be represented by D=S SH.

The present disclosure aims to minimize average distortion. The disclosure aims to automatically determine at least one set of correction parameters using a number of sample images. The correction parameters are stored in a storage device until the correction parameters can be subsequently applied to an image. Generally, the correction parameters are determined during the training phase at S202, which is hereinafter synonymously referred to as a "calibration phase".

Training Phase

Figure 7A:
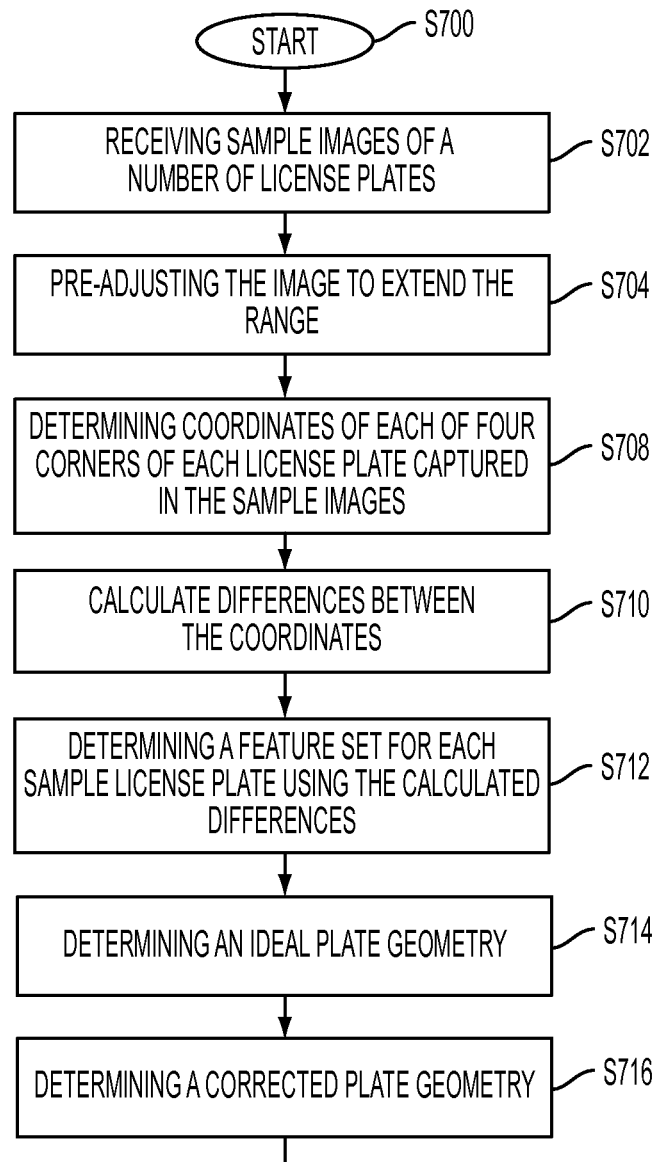
FIG. 7 is a flow chart that describes the calibration phase used to determine the at least one correction matrix.
Figure 7B:
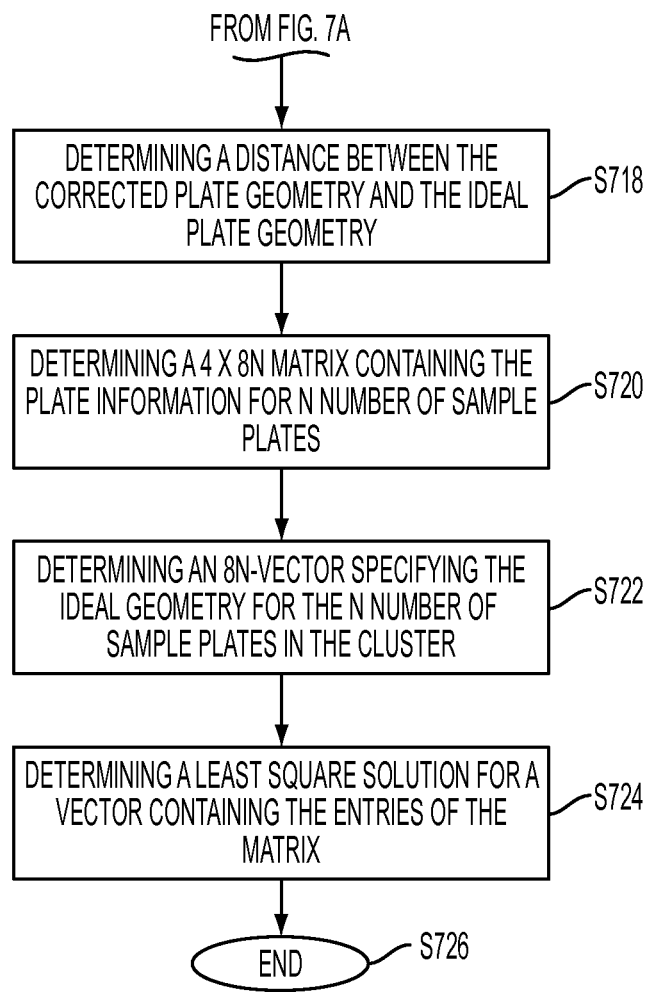

Referring to FIG. 7, a flow chart is shown for describing the calibration phase used to determine the at least one correction matrix. The calibration can be performed either on-line or off-line. The method starts at S700. A number of sample images are received at the training device at S702 (see 102 in FIG. 1). The images are preferably captured from the camera that is going to be calibrated. As earlier mentioned, the sample images can be provided to the training device in electronic format. The sample image data can be provided as input to the training device from any suitable source. The sample images each include a sample license plate and/or a bumper region including the sample license plate.

The ALPR camera that is selected for being calibrated at S702 can be operated at full range when capturing the sample plate images. In other words, the camera can search for sample plates including all possible shearing and scaling parameters. However, embodiments are contemplated where the ALPR camera operates with a limited searching range. If the sample images are provided by an ALPR camera that is operating in a limited search range, the range can be extended at S704 by pre-adjusting the input image.

For an ALPR camera that handles only a scale in a first range, the input image can be pre-scaled by a factor that enables the camera to operate in the scale of a modified range. The modified range can have lower and upper values that are products of the factor and the respective lower and upper values of the first range. The results of the first range and the modified range can be combined to generate a larger range having a lower value that is the lower value of the first range and an upper value that is the upper value of the modified range. In one illustrative example using an ALPR camera that handles only a scale in the range of 0.8-1.2, pre-scaling of the input image by a factor, for example, of ⅔, can enable the camera to operate in the scale of 1.2-1.8. By combining the results detected in the original image and the pre-scaled image, the effective range becomes 0.8-1.8.

The pre-scaling at S704 can, in another example, be adjusted by a factor of 4/9. In this case, an original scale in the range of 0.8 to 1.2 can be extended to operate in the range of 0.8-2.7. By pre-adjusting the input image using different scaling and shearing parameters, the range of the ALPR camera can be extended substantially.

With continued reference to FIG. 7, the coordinates of each of the four corners of each sample license plate in a first one of the groups are determined for the sample images at S708. The coordinates include the x,y coordinates for the bottom-left corner $(x_{i1},y_{i1})$, the bottom-right corner $(x_{i2},y_{i2})$, the top-left corner $(x_{i3},y_{i3})$, and the top-right corner $(x_{i4},y_{i4})$ of each i-th plate. These corners can be obtained as part of the ALPR intermediate or final outputs. However, in another embodiment, the coordinates can be determined by detecting the four boundaries of the sample plate and then calculating the intersections of the boundaries. A Hough Transform can be used to detect the boundaries.

With continued reference to FIG. 7, differences ($dx_{i1}$, $dx_{i2}$, $dx_{i3}$, $dx_{i4}$, $dy_{i1}$, $dy_{i2}$, $dy_{i3}$, $dy_{i4}$) between the coordinates are calculated for each sample license plate at S710. The differences are determined using the following equations.

$$dx_{i1}=x_{i2}-x_{i1} \quad dy_{i1}=y_{i2}-y_{i1}$$

$$dx_{i2}=x_{i3}-x_{i1} \quad dy_{i2}=y_{i3}-y_{i1}$$

$$dx_{i3}=x_{i4}-x_{i3} \quad dy_{i3}=y_{i4}-y_{i3}$$

$$dx_{i4}=x_{i4}-x_{i2} \quad dy_{i4}=y_{i4}-y_{i2} \tag{3}$$

With continued reference to FIG. 7, the calculated differences are used to determine a feature set $V_i$ for each sample license plate at S712. More specifically, the determination uses $dx_{ij}/dy_{ij}$ defined in equation (3) as the feature set, where i is the image index and j=1-4. The feature set $V_i$ is a 2×4 matrix that specifies the geometry of the i-th sample plate. The feature set for an i-th plate is defined as:

$$V_i = \begin{bmatrix} dx_{i1} & dx_{i2} & dx_{i3} & dx_{i4} \\ dy_{i1} & dy_{i2} & dy_{i3} & dy_{i4} \end{bmatrix} \tag{4}$$

The features measure the degree of shearing. For rear plates, the measurements are clustered into two groups. The clustering can be obtained using existing methods, such as, for example, a K-means algorithm.

With continued reference to FIG. 7, a feature set D is also determined for an ideal plate geometry at S714. The feature set D is represented by a 2×4 matrix that defines a rectangle where w and h is the ideal width and height of the rectangle:

$$D = \begin{bmatrix} w & 0 & w & 0 \\ 0 & h & 0 & h \end{bmatrix} \tag{5}$$

With continued reference to FIG. 7, a corrected plate geometry $CV_i$ is determined for each sample plate at S716, where C is the matrix and $V_i$ is the feature set describing the original plate geometry. The corrected plate geometry is obtained by matrix multiplication. Next, a distance between the corrected plate geometry and the ideal plate geometry is determined at S718 and is represented by $\|CV_i-D\|$. The mathematical symbol "$\|$" denotes the Frobenius norm, which is the square sum of all matrix entries determined for the number of sample plates.

With continued reference to FIG. 7, a correction matrix is determined at 720. The correction matrix is a two-dimensional correction matrix represented by the equation:

$$C = \arg\min_C \Sigma_i \|CV_i - D\| \tag{6}$$

where i is the license plate index and the summation is over all license plates. More specifically, the optimization is performed for each cluster separately. Two matrices $C_1$ and $C_2$ are computed for correcting slant plates and upright plates, respectively. The optimization in Equation (6) is described below for determining how a matrix can be obtained using a least square method. More specifically, a vector c' is a vector containing the entries of the matrix C.

$$c'=[C_{11} C_{12} C_{21} C_{22}] \tag{7}$$

With continued reference to FIG. 7, a 4×8N matrix V' is formed containing the plate information for N number of sample license plates at S720. More specifically, the matrix V' is constructed using only plates belonging to the same cluster. The matrix V' is represented by the equation:

$$V' = \begin{bmatrix} dx_{11} & dx_{12} & dx_{13} & dx_{14} & 0 & 0 & 0 & 0 & & dx_{N1} & dx_{N2} & dx_{N3} & dx_{N4} & 0 & 0 & 0 & 0 \\ dy_{11} & dy_{12} & dy_{13} & dy_{14} & 0 & 0 & 0 & 0 & & dy_{N1} & dy_{N2} & dy_{N3} & dy_{N4} & 0 & 0 & 0 & 0 \\ & & & & & & & & \cdots & & & & & & & & \\ 0 & 0 & 0 & 0 & dx_{11} & dx_{12} & dx_{13} & dx_{14} & & 0 & 0 & 0 & 0 & dx_{N1} & dx_{N2} & dx_{N3} & dx_{N4} \\ 0 & 0 & 0 & 0 & dy_{11} & dy_{12} & dy_{13} & dy_{14} & & 0 & 0 & 0 & 0 & dy_{N1} & dy_{N2} & dy_{N3} & dy_{N4} \end{bmatrix} \quad (8)$$

Next, a vector D' is determined at S722 as including an 8N-vector specifying the ideal geometry for the N number of sample plates in the cluster. The vector D' is represented by the equation:

$$D' = [w0w00h0h \ldots w0w00h0h]^T \quad (9)$$

where T is a matrix transpose.

With continued reference to FIG. 7, the least square solution for vector c' is determined at S724 as:

$$c' = (V'V'^T)^{-1}V'D' \quad (10)$$

Afterwards, the correction matrix $C_1$, $C_2$ for the second cluster is determined. The method ends at S726.

Operation Phase

The correction matrices $C_1$, $C_2$ determined in the training phase are stored in the storage device until the calibrated camera is placed in operation. Generally, the calibrated camera is positioned at a select location in a transportation infrastructure to enable the camera to locate and/or capture images of license plates. The camera is used to monitor the vehicular traffic flow and the image is used to identify license plate numbers on the vehicles.

FIG. 8 shows a flow-chart describing an operation for correcting an image 800 captured by the camera and, more specifically, for identifying a license plate number included in the image. The method starts at S802. The image capture device that was calibrated using the process described in FIG. 7 is provided at S804. An input image (hereinafter referred to as "actual image") is received at the image correction device (see 106 in FIG. 1) from the calibrated camera at S806.

With continued reference to FIG. 8, the actual image can be adjusted at S808 if the calibrated camera is handling a scale in a limited range. The method of adjusting the actual image is analogous to the pre-scaling operation that was described as S704 in FIG. 7. The correction proceeds with using the correction matrix that was determined in the training phase for adjusting the image. The adjustment is performed as $$v'(x,y) = v[(x',y')] \quad (11)$$

where v (.,.) and v'(.,.) are input and corrected images, respectively, and (x', y') is calculated as $$\begin{bmatrix} x' \\ y' \end{bmatrix} = C \begin{bmatrix} x \\ y \end{bmatrix}. \quad (12)$$

If at least one of the x' and y' is not an integer, v(x', y') is determined from its nearest neighbors using, for example, a linear interpolation.

For the rear plates, the matrix for correcting the slant plates are first applied at S810. If no plate is detected by the ALPR, the input image is adjusted again using the matrix for the upright plates at S812. This process enables the system to detect the plates for both cases. The method ends at S814.

Figure 9:
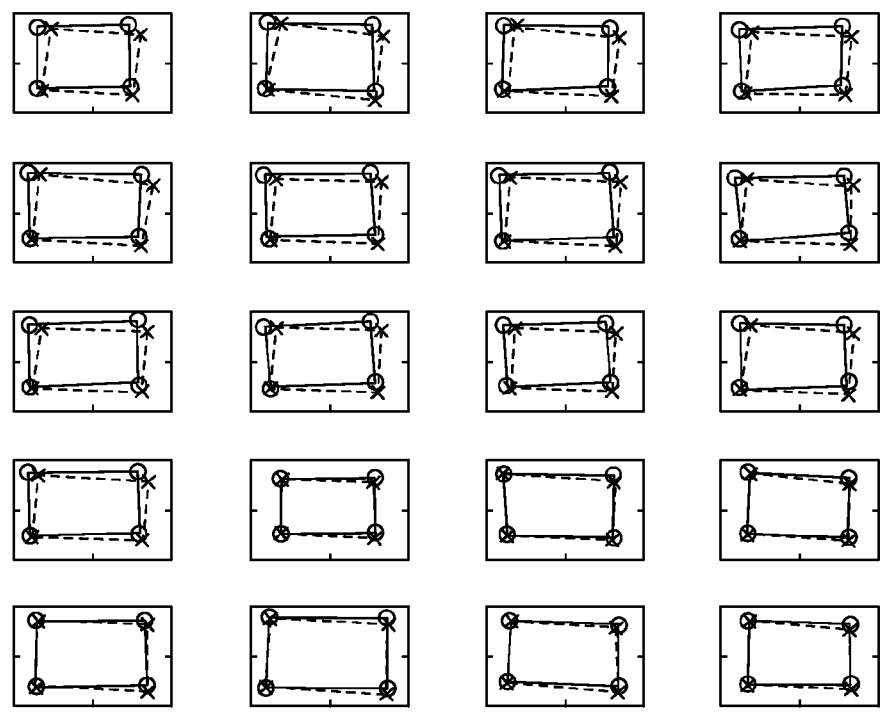
FIG. 9 shows images of plates before and after correction.

FIG. 9 shows a series of images of plates before and after the correction is applied to the captured image. The images shown in phantom include the outlines of original plates that are received from the image capture device. The first thirteen plates define slanted plates. The last seven plates define upright oriented plates. The original images are overlaid with corrected images, shown in solid. As viewable, the corrections generally tend to correct the orientation of the plate to a substantially ideal rectangle.

Drift Compensation

After the initial calibration, the system may keep on monitoring the ALPR results, and detecting the parameter drifting. After a predetermined period of time, such as, for example, every 24-hours or every five minutes, the system may repeat the process described in FIG. 7 for recalculating and updating the correction matrices using the recent ALPR detection data. The system may also send an alert if the drift exceeds a pre-set threshold or limit.

One aspect of the present disclosure is a significant reduction in the search range for the ALPR. The present system reduces the computational cost associated with plate correction. The system further improves the error rate associated with false positives. A further aspect of the system is an image capture device that is adapted to self-adjust the pre-processing parameters over time to compensate for geometrical and camera parameter drifting.

Example Implementation

Figure 10A:
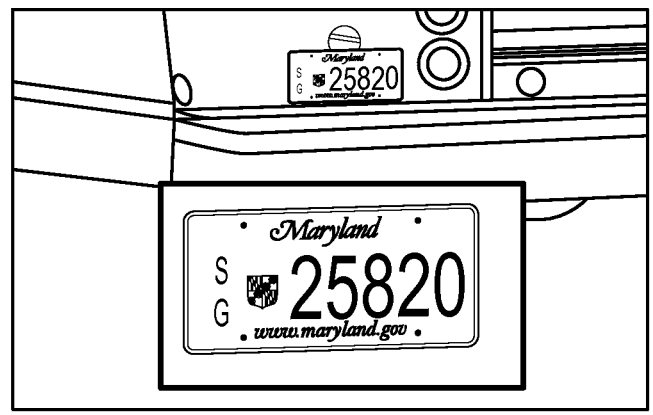
FIGS. 10A-B show captured images that were used as input for an experimental implementation of the operation phase.
Figure 10B:
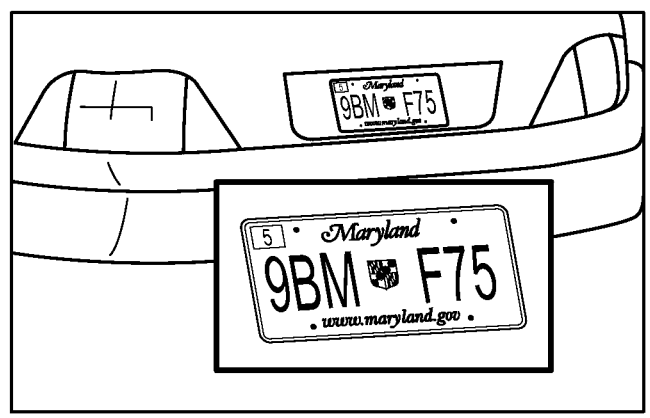

An example implementation of the operation phase is illustrated as captured images and results in FIGS. 10A-B and 11A-B. FIGS. 10A and 10B show two input images that were captured by a calibrated image capture device. FIG. 10A shows an image of an original license plate that was captured and having an upright mounting. As viewable in the figure, the plate is mounted upright, but the vehicle that the plate is mounted on is positioned at an angle relative to the image capture device. In this manner, the plate is captured at an angle along its horizontal axes.

FIG. 10B shows an image of an original license plate that was captured and having a slanted mounting. As viewable in the figure, the plate is mounted at an incline, so it is angled relative to the camera along its vertical axes. As further viewable in the figure, the vehicle that the plate is mounted on is positioned at an angle relative to the image capture device. In this manner, the plate is also captured at an angle along its horizontal axes.

Figure 11A:
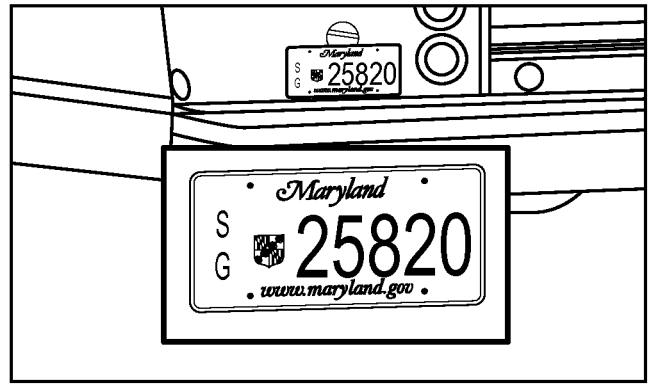
FIGS. 11A-B show corrected images of FIGS. 10A-B after undergoing the operation described in the disclosure.
Figure 11B:
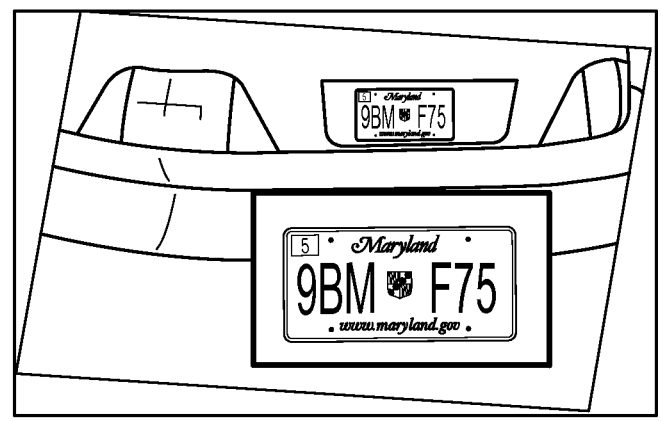

These images were tested using the operation described for FIG. 8. FIGS. 11A and 11B are the corrected image after undergoing the process. FIG. 11A shows the corrected plate for the upright image shown in FIG. 10A. As viewable, the corrected plate is provided as a generally rectangular output image with four corners each having a substantially 90-degree angle. Similarly, the corrected image shown in FIG. 11B for the slanted plate of FIG. 10B is also shown with a generally rectangular, i.e., ideal, shape and having four substantially 90-degree angles.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for adjusting a license plate detected in a captured image, the method comprising:
   providing at least one set of correction parameters, the providing the at least one correction matrix including:
   determining a feature set by calculating differences between the x,y coordinates of the four corners;
   determining an original plate geometry matrix $V_i$ of the feature set;
   determining an ideal plate geometry D, wherein vectors of the D matrix are defined by a height and width of an ideal rectangular plate;
   determining a corrected plate geometry $CV_i$;
   determining a distance between the corrected plate geometry and the ideal plate geometry by subtracting the ideal plate geometry from the corrected plate geometry ($CV_i$–D); and,
   determining the at least one set of correction parameters by squaring a sum of all matrix entries for the license plates;
   receiving an input image representing a detected license plate;
   in response to receiving the input image, automatically adjusting the input image to obtain a corrected image using the at least one correction matrix.

2. The method of claim 1, wherein the adjusting further includes:
   determining if the slant-oriented plate was detected after applying the first set of correction parameters;
   in response to the slant-oriented plate not being detected, applying at least a second set of correction parameters corresponding to an upright-oriented plate.

3. The method of claim 1, wherein the adjusting includes:
   applying one set of correction parameters if the input image includes a front plate and applying two matrices if the input image includes a rear plate.

4. The method of claim 1, wherein the adjusting includes:
   scaling the detected plate in the input image to a predetermined size; and,
   adjusting the detected plate in the input image to compensate for distortion.

5. The method of claim 1, wherein the providing the at least one set of correction parameters includes:
   providing an image capture device;
   receiving images of N number of license plates captured by the image capture device;
   determining x,y coordinates for each of four corners of each license plate captured in the images;
   determining a set of correction parameters for each image.

6. The method according to claim 1, wherein the providing the at least one set of correction parameters further includes:
   determining a matrix V' containing the plate information for the N number of plates;
   determining an ideal plate geometry D'; and,
   calculating vector c' using the matrix V' and matrix D'.

7. The method according to claim 6, wherein the N number of plates all include one of upright-oriented and slant-oriented plates.

8. The method according to claim 6, wherein the determining the ideal plate geometry D' includes:
   specifying an ideal height and width of the number N of license plates.

9. A computer program product comprising non-transitory media which encodes instructions for performing the method of claim 1.

10. A system for adjusting an input image, the system comprising:
    a correction device comprising memory which stores instructions for performing the method of claim 1 and a processor, in communication with the memory for executing the instructions.

11. A system for adjusting an input image, the system comprising:
    an input device adapted to capture an image of a license plate;
    a correction device in communication with the input device, the correction device adapted to:
       receive the input image transmitted from the input device
       determine x,y coordinates for each of four corners of the license plate in the input image;
       determine a feature set by calculating differences between the x,y coordinates of the four corners;
       determine an original plate geometry matrix $V_i$ of the feature set;
       determine an ideal plate geometry D, wherein vectors of the D matrix are defined by a height and width of an ideal rectangular plate;
       determine a corrected plate geometry $CV_i$;
       determine a distance between the corrected plate geometry and the ideal plate geometry by subtracting the ideal plate geometry from the corrected plate geometry ($CV_i$–D);
       obtain an optimization using a least square root method; and
       in response to receiving the input image, automatically adjusting the input image v[(x',y')] to obtain a corrected image v'(x,y) by applying at least one correction matrix;
    a storage device in communication with the correction device, the storage device adapted to store the at least one correction matrix;
    an interface in communication with the correction device, the interface adapted to display the corrected image.

12. The system according to claim 11, further comprising:
    a training device in communication with the storage device, the training device adapted to:
       determine a matrix V' containing the plate information for the N number of plates;
       determine an ideal plate geometry D'; and,
       calculate vector c' using the matrix V' and matrix D'.

13. The system according to claim 12, wherein the N number of plates includes one of front plates, rear slant-oriented plates, and rear upright-oriented plates.

14. The system according to claim 11, wherein the at least one correction matrix scales the image and corrects for distortion caused by the input device.

15. The system according to claim 11, wherein the correction device determines the four corners by detecting boundaries of the license plate and calculating intersections of the boundaries.

16. The system according to claim 11, wherein the at least one correction matrix corresponds to a slant-oriented license plate.

17. The system according to claim 16, wherein the storage device is adapted to store at least a second correction matrix corresponding to an upright-oriented license plate and the correction device is adapted to automatically adjust the input image by applying the at least second correction matrix after applying the at least first correction matrix.

18. A system for adjusting an input image, the system comprising:
- a training device adapted to:
  - determine a feature set by calculating differences between the x,y coordinates of the four corners;
  - determine an original plate geometry matrix $V_i$ of the feature set;
  - determine an ideal plate geometry D, wherein vectors of the D matrix are defined by a height and width of an ideal rectangular plate;
  - determine a corrected plate geometry $CV_i$;
  - determine a distance between the corrected plate geometry and the ideal plate geometry by subtracting the ideal plate geometry from the corrected plate geometry ($CV_i$–D); and,
  - determine a correction matrix C by squaring a sum of all matrix entries for the license plates;
- a storage device in communication with the training device, the storage device adapted to store the at least one correction matrix;
- an input device adapted to capture an image of a detected license plate;
- a correction device in communication with the input device and the storage device, the correction device adapted to:
  - receive the captured image transmitted from the input device, and in response to receiving the input image, automatically adjusting the input image $v[(x',y')]$ to obtain a corrected image $v'(x,y)$ by applying the at least one correction matrix;
- an interface in communication with the correction device, the interface adapted to display the corrected image.

* * * * *